INVENTORS.
HERMAN EPSTEIN
ROBERT E. BENN
BY Edward W. Hughes
ATTORNEY

INVENTORS.
HERMAN EPSTEIN
ROBERT E. BENN
BY Edward W. Hughes
ATTORNEY

United States Patent Office 3,441,437

Patented Apr. 29, 1969

3,441,437

RECORDING MEDIUM AND PROCESS OF DEVELOPING LATENT ELECTROSTATIC IMAGE ON A RECORDING MEDIUM

Herman Epstein, Melrose Park, and Robert E. Benn, Bromall, Pa., assignors to Burroughs Corporation, Detroit, Mich., a corporation of Michigan Continuation of application Ser. No. 714,767, Feb. 12, 1958. This application Jan. 25, 1963, Ser. No. 255,715

Int. Cl. G01d *9/00;* B05b *5/02*

U.S. Cl. 117—17.5 24 Claims

This invention relates to electrographic recording processes, and more particularly to improvements in such processes resulting from the use of a recording medium having desired electrical characteristics and to this improved recording medium.

This application is a continuation of prior application Ser. No. 714,767, filed Feb. 12, 1958 by the same inventors and now forfeited.

The electrographic recording process consists broadly of three steps. The first step comprises establishing, or printing, electrically charged areas on selected portions of a recording medium, which areas are representative of information. The second step consists of developing such charged areas on the recording medium by making them visible, for example. The third step, which is optional, consists in fixing, or rendering such developed areas substantially permanent. In the electrographic recording process, these three steps take place sequentially and at physically separate locations.

The recording medium is preferably made of a backing layer, or web of paper, on one side of which is bonded a thin layer of high resistivity, or dielectric material. The period of time necessary to establish an electrostatic charged area on the dielectric layer is of the order of $10^{-9}$ seconds, or less. This makes it possible to move the recording medium through the printing station, the place where the electrically charged areas are established, at substantially constant high speeds. It is desirable that the speeds at which the developing and fixing steps can be performed on the recording medium be compatible with the speed with which the recording medium passes through the printing station.

In the electrographic recording process, it is also desirable that the charge density of the charged areas established, or deposited, on the dielectric layer of the recording medium be maximized in order to facilitate the developing, or inking step. The reason for this, as will be explained in greater detail later, is that the amount of ink attracted to a charged area is a function of the amount of charge existing in a charged area, or the surface density of the charge. This, in turn, determines the degree of contrast between an inked area, and a non-inked area.

In early forms of the apparatus for practicing electrographic recording, reliable and good quality inking of the charged areas of the dielectric layer of the recording medium were not always obtained. There were variations in the quality of the inking which had nothing to do with what would normally be expected to control; such as, the voltages used in the establishment of the charged areas at the printing station. After many attempts to resolve the difficulty, it was discovered that the magnitude of the resistivity of the backing layer of the recording medium was a significant factor in determining whether or not satisfactory inking could be obtained.

It is, therefore, an object of this invention to provide improvements in the electrographic recording process.

It is a further object of this invention to provide an improved electrographic recording process in which the charge density of the electrically charged portions of the dielectric layer of the recording medium is maximized.

It is another object of this invention to provide an improved process for developing electrostatic latent images of a recording medium.

It is still another object of this invention to provide an improved high speed method of developing information in the form of electrically charged areas of a recording medium.

It is a still further object of this invention to provide in the electrographic recording process, improvements in charging selected areas of the dielectric layer of the recording medium and in developing the charged areas so that reliable inking of the recording medium can be achieved with inking stations of reasonable size and at speeds of movement of the medium through the inking station which do not limit the maximum recording rate.

It is a still further object of this invention to provide an improved recording medium comprising a laminated thin material of characteristics such as to provide improved electrographic recording thereon and wherein such recording may be effected with the medium traveling at high speeds.

Other objects and many of the attendant advantages of this invention will be readily appreciated as the same become better understood by reference to the following detailed description when considered in connection with the accompanying drawings, wherein.

Figure 1:
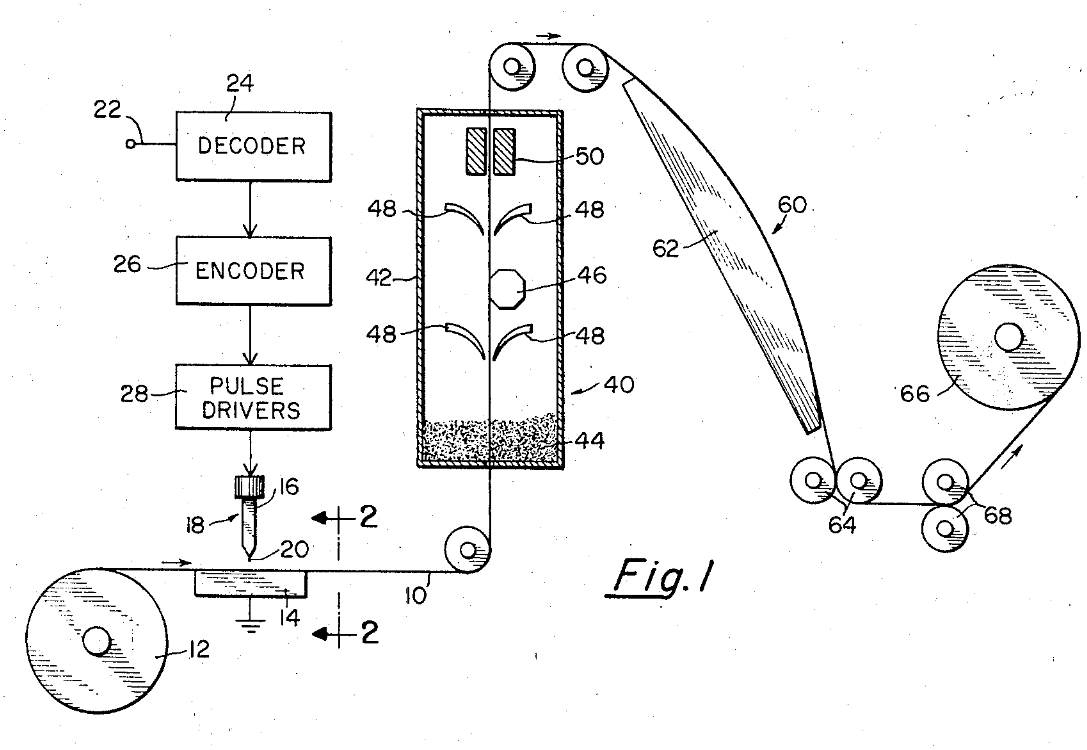
FIG. 1 is a schematic diagram of apparatus for practicing the electrographic recording process.
Figure 3:
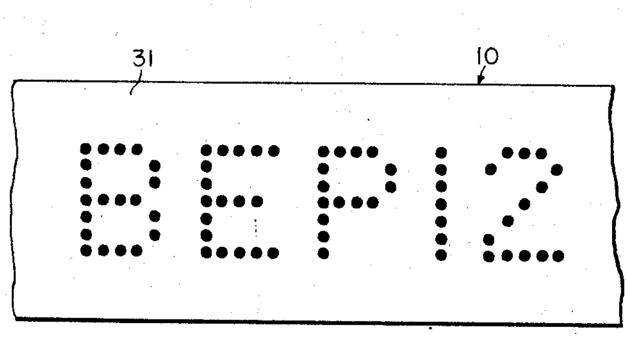
FIG. 3 is an enlarged example of electrographic recordings.
Figure 2:
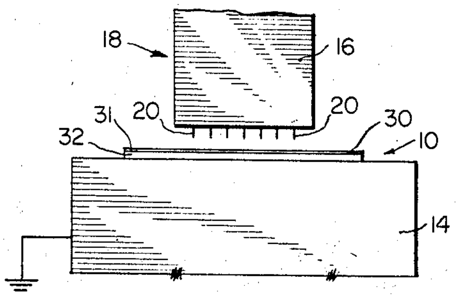
FIG. 2 is an enlarged sectional view taken on line 2—2 of FIG. 1.

Referring to FIG. 1, the recording medium 10 is illustrated as being initially wound on storage reel 12. As the recording medium 10 is unrolled, it passes between the back electrode 14 and printing head 16 at printing station 18, where electrically charged areas are established on selected portions of the recording medium 10. When printing head 16 is comprised of a single column of seven equidistantly spaced front electrodes 20, as indicated in FIG. 2, which electrodes 20 are arranged substantially in a line at right angles to the direction of movement of medium 10, it is necessary to apply print voltage pulses to selected ones of the front electrodes 20 in proper sequence to print alphanumeric information in the format illustrated in FIG. 3. Input signals which may be in the form of standard Teletype code are applied to input terminal 22. In the decoder 24, the coded input signals cause one conductor which corresponds to the symbol, letter, or numeral represented by a given code group to be energized. In the encoder 26, the information represented by an energized line from decoder 24 is translated into which of the electrodes 20 are to be energized, and in what order they are energized, to form the given information. Encoder 26 controls the energization of a plurality of pulse drivers 28, one of which is associated with each front electrode 20 of print head 16. Print voltage pulses are applied to those electrodes 20 determined by encoder 26 to establish charged areas on recording medium 10. The application of the print pulses and movement of the recording medium 10 past the printing station 18 are synchronized to obtain examples of recording such as are illustrated in FIG. 3. For greater detail as to the construction and operation of a decoder, an encoder and pulse drivers, reference is made to U.S. patent application Ser. No. 443,646, entitled, "Electrographic Printer," filed July 15, 1954, by Herman Epstein and Frank T. Innes, now U.S. Patent No. 3,012,839, which application and patent are assigned to the assignee of this application.

In a preferred embodiment, a negative print voltage pulse of sufficient amplitude, of the order of 1500 volts, is applied to one of the electrodes 20 to initiate an electrical discharge between the pulsed electrode 20 and back electrode 14. It should be noted that the gases in the gap between electrodes 20 and medium 10 are substantially at ambient atmospheric pressure. The amplitude of the print voltage pulses is such as to cause an electron to be emitted from electrode 20 to which the pulse is applied, or an electron from an external source enters into the field between the pulsed front electrode 20 and back electrode 14. The initial electron is accelerated by the intense electric field and collides with molecules in the gap between the pulsed electrode 20 and back electrode 14. These collisions ionize the molecules and produce additional electrons. From the original electron there is formed an avalanche which propagates rapidly across the gap. If the recording medium 10 were not located in the gap, the formation of such an avalanche would immediately lead to a complete and disruptive breakdown. The presence of recording medium 10 prevents this.

It is believed that the termination of the discharge occurs for the following reasons. The avalanche propagates across the gap until its leading edge contacts the surface 31 of dielectric layer 30 of the recording medium 10. Here the propagation ceases and the electrons and negatively charged ions are deposited on the high resistivity coating 30 as a surface charge, see FIG. 4. The avalanche, while no longer growing, continues to deposit electrons and negatively charged ions on the dielectric coating 30 due to the applied potential until a reverse potential is built up across the medium 10. As this reverse potential increases, the effective potential between the pulsed electrode 20 and the surface 31 of the dielectric film 30 decreases until the potential at the upper surface 31 of the dielectric film 30 is such that there is no further accumulation, or deposition, of electric charges on the film 30.

The physical extent of the discharge is determined by the fact that the electric field strength decreases rapidly off the axis of the front electrode 20, and a critical field strength is soon reached at which cumulative ionization does not occur. This critical field strength marks the outer surface of the avalanche and thus the outer edge of the charged spot 70. The size of spot 70 can be controlled in part by the amplitude and width of the voltage pulse, the spacing between the front and back electrodes, and by injecting an electronegative gas and water vapor into the space between the front electrode 20 and dielectric layer 30 of recording medium 10, as described in patent application Ser. No. 660,408, entitled "Atmosphere for Electrographic Printing," filed May 20, 1957, by Robert E. Benn, now U.S. Patent No. 3,023,070, issued Feb. 27, 1962, which application and patent are assigned to the assignee of this application.

For every print voltage pulse applied to a front electrode 20, an electrically charged area, or electrostatic latent image, will be established on the exposed surface 31 of dielectric film 30 which is between the pulsed front electrode 20 and the back electrode 14 at the time the pulse is applied. Essentially, these charged areas, when using sharply pointed pin electrodes, are substantially in the form of small circular dots as illustrated in FIG. 3.

After charged areas have been established on the dielectric layer 30 of recording medium 10 at the printing station 18, the next step in the process occurs at the developing, or inking station 40. The inking station is illustrated as comprising a hollow housing 42 through which the recording medium 10 passes substantially vertically. The lower portion of housing 42 is filled with a suitable powdered electrically conducting ink 44. Recording medium 10 enters the bottom of the housing through a narrow opening. Ink 44 is prevented from falling out of the opening by any conventional means such as felt seals, which are not illustrated. The depth of ink 44 in the bottom of housing 42 is sufficient to entirely surround the recording medium in close proximity to medium 10, or medium 10 is immersed in ink 44. After medium 10 has passed through the mass of ink 44, particles of ink that may be carried along with the medium but which are not attracted to the charged areas of the medium, are removed by means such as vibrator 46, baffles 48 and vacuum cleaner 50. After the recording medium emerges from the inking station 40, particles of ink are found to be adhering substantially only to the electrically charged areas of film 30.

The manner of fixing the ink to the recording medium depends in part on the physical characteristics of the dielectric layer 30. Fixing station 60 is suitable for use when the dielectric layer 30 is made of a thermoplastic material having resistivitites of sufficiently high value such as polyethylene, or polystyrene, for example. Fixing station 60 is comprised of a heater 62 and a pair of calendering rolls 64. Heater 62 is preferably an electric heater and is adjusted to provide sufficient heat to the recording medium 10 while the medium is passing over it to cause layer 30 to become soft and tacky. Shortly after leaving heater 62, the recording medium passes between calendering rolls 64 which forces the ink particles into the dielectric film so that they are physically bonded to film 30. The recording medium may then be taken up on take-up reel 66 if so desired. Power to move the recording medium past printing station 18, inking station 40, and fixing station 60 may be applied by drive rollers 68 which are powered by a suitable motor which is not illustrated.

A satisfactory form of recording medium 10 consists of a backing layer 32 which is approximately .003 inch thick. Bonded to one side of layer 32 is the thin dielectric layer 30, approximately .0005 inch thick which is made of polyethylene to which has been added substantially 15%, by weight, of titanium dioxide as a pigment. A preferred formulation of backing layer 32 is 1500 lbs. of dry unbleached Scandinavian pulp with substantially no alum or sizing added, plus 75 lbs. of standard commercial grade carbon black. The polyethylene coating is extruded onto the paper. Another formulation which has been found satisfactory for the backing layer consists of 1500 lbs. of dry fully bleached Scandinavian pulp, 75 lbs. of carbon black, 25 lbs. of starch sizing and 70 lbs. of alum. The electrical volume resistivities of backing layers made of either formulations are computed to be of the order of $5\times10^6$ ohm-centimeters. The volume resisitivity of the polyethylene is of the order of $10^{15}$ ohm-centimeters or more. The volume resistivity of the backing layer is a function of the amount of carbon black dispersed in the layer. The amount of carbon black to be added to a batch of pulp to obtain a given volume resistivity is determined empirically.

The method of determining the resistivities of the backing layer is as follows: A circle of a conductive material such as conductive silver, or "AquaDag," having a diameter of approximately one quarter inch is formed on one surface of the backing layer. A toroid of the same material having an inner diameter of approximately one half inch is formed concentric with the inner circle and on the same side of the backing layer. The outer diameter of the toroid is approximately one inch. The resistance between the circle and the toroid is then measured in ohms. The volume resistivity of the backing layer can then be computed since the thickness of backing layer can be measured.

It has been determined that backing layers having electrical volume resistivities determined as described above, in the range of from $10^5$ ohm-centimeters to $10^9$ ohm-centimeters, produce good inking at reasonably high rates of travel of the recording medium, i.e., 100 inches per second, without requiring the inking station to be of excessive size. Backing layers having a volume resistivity greater than $10^{10}$ ohm-centimeters have not proved satisfactory, and papers having a volume resistivity of less than $10^5$ ohm-centimeters do not prove satisfactory when used in electrographic recording apparatus where back electrode switching is used such as is described in patent application Ser. No. 650,890, filed Apr. 5, 1957, entitled "Page Printing Apparatus," by Herman Epstein, now U.S. Patent No. 2,955,894, issued Oct. 11, 1960, which application and patent are assigned to the assignee of this application.

In the page printing apparatus, selected back or anvil electrodes are supplied with a voltage of polarity and magnitude which when added coincidentally with voltages applied to selected discharging electrodes together cause electrostatic discharge of selected characters upon selected loci on the dielectric coating of the recording medium. Hence, recording medium backing layers with volume resistivity of less than $10^5$ ohm-centimeters are unsatisfactory because they would tend to short out the back electrodes and would take too much power from the drivers. Where a single back electrode such as is illustrated in FIG. 1 is used, there is no lower limit for the minimum values of the resistivity of the backing layer.

In general, papers whose resistivities are primarily determined by ionic conductors dispersed in the papers have not, without means such as humidors to control the moisture probelm, proved to be as commercially desirable as carbon black. The reason for this is that the resistivity of the backing layer is then primarily a function of its moisture content; and when the moisture content is low, the resistivity of the paper is greater than the upper limit of the desired range of values. Carbon black has so far been the most satisfactory material discovered which will produce, when mixed with paper pulp, the desired range of resistivities substantially independent of the moisture content of the layer and without adversely affecting the physical characteristics of the backing layer.

Figure 4:
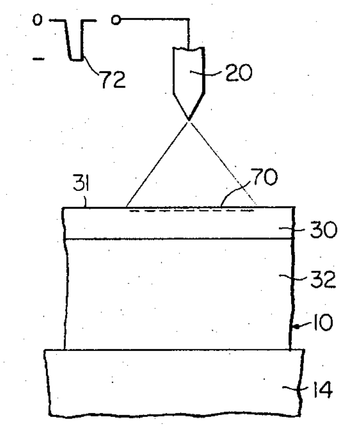
FIG. 4 is a greatly enlarged schematic diagram illustrative of a portion of the printing station of an electrographic recording device.

FIG. 4 is an enlarged schematic diagram of a single front electrode 20, for example, together with back electrode 14. When a print voltage pulse 72 is applied to electrode 20, an avalanche of electrons is formed in the area between electrode 20 and the upper surface 31 of dielectric layer 30. As described above, this avalanche establishes charged area 70 on film 30. In FIG. 4, the voltage pulse 72 is indicated as being negative, and back electrode 14 is indicated as being maintained at references, or ground potential. As a result of studies of the establishment of a charged area, it is believed that each charged area is formed by a single avalanche and that the necessary time for the avalanche to propagate from electrode 20 to film 30 is of the order of $10^{-9}$ seconds or less. While the description and drawings have indicated the use of negative print pulses to establish negatively charged areas on the recording medium, the electrographic recording process is not limited in this manner. Positive print pulses can be applied to the front electrode, for example, and positively charged areas can be established on the surface of dielectric layer 30 if so desired. Such positively charged areas are developed in substantially the same way as the negatively charged areas.

Figure 5:
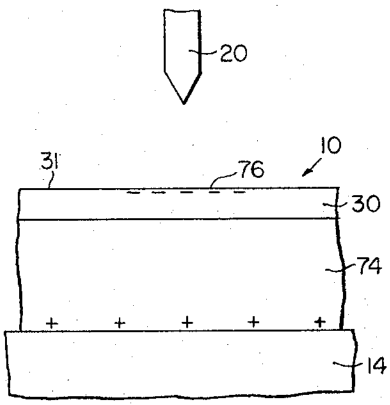
FIG. 5 is a schematic diagram similar to FIG. 4 showing the idealized distribution of electric charges on the recording medium after a charged area has been established, and when the backing layer is made of a high resistivity material.
Figure 6:
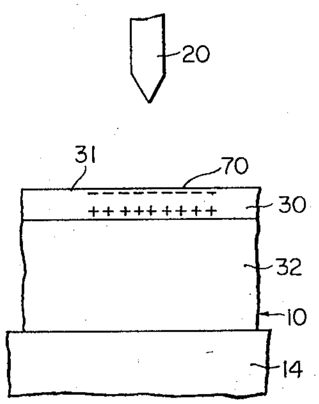
FIG. 6 is a schematic diagram similar to FIG. 4 showing the idealized distribution of electric charges on the recording medium when the resistivity of the backing layer is within the desired range of values.

FIGS. 5 and 6 are illustrative of the idealized distribution of electric charges on the recording medium shortly after the termination of the print pulse. In FIG. 5 it is assumed that the volume resistivity of the backing layer 74 is comparable with that of dielectric layer 30 and is of the order of $10^{15}$ ohm-centimeters. This provides disadvantages which this invention overcomes. In FIG. 6 it is assumed that the volume resistivity of backing layer 32 is not more than $10^9$ ohm-centimeters. In FIG. 5, layers 30, 74 together form the dielectric of what may be considered as the equivalent of a capacitor, with the thickness of the dielectric being substantially equal to that of layers 30 and 74.

In FIG. 6, because of the relatively lower resistivity of backing layer 32 as compared with layer 30, layer 30 forms the dielectric of an equivalent capacitor. The distance between the charges, the thickness of the dielectric, is substantially equal to that of layer 30. As is well known, the capacitance of a capacitor is inversely proportional to the thickness of the dielectric. It is, therefore, quite obvious that the capacitance per unit area of the equivalent capacitor formed only by the dielectric layer 30 in FIG.6 is much larger than the capacitance of the equivalent of the capacitor illustrated in FIG. 5, which is formed of the two layers 30 and 74. It is also well known that the potential across a capacitor is inversely proportional to the capacitance and directly proportional to the charge. Thus, at substantially equal voltages, there will be a greater electric charge stored on the equivalent capaci'or illustrated in FIG. 6 than there will be on the equivalent capacitor illustrated in FIG. 5; and the surface density of electric charges on area 70 in FIG. 6 will be considerably greater than that surface density of areas 76 in FIG. 5.

Figure 7:
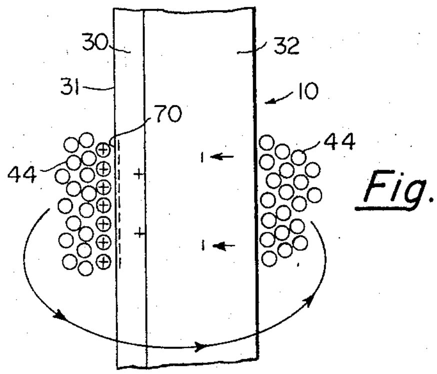
FIG. 7 is a greatly enlarged schematic diagram illustrating the developing, or inking process with a low resistivity backing layer.

In the inker 40, the recording medium 10 is initially immersed or surrounded in a layer of powdered ink 44 as illustrated in FIG. 7. In FIG. 7, particles of ink 44 are illustrated as circles. A satisfactory ink for use in the electrographic recording process has been made by spray drying a ball milled slurry comprised of carbon black, a hydrocarbon thermoplastic synthetic resin, a solvent, and a wetting agent, and by selecting a preferred distribution of sizes from the resulting particles by regulation of the process itself and subsequent screening. The powder obtained is dry, black, electrically conductive, of relatively low specific gravity and flows freely. The following is an example of one formulation by weight of such a slurry:

| | Percent |
|---|---|
| Resin | 21 |
| Carbon black | 14 |
| Solvent | 64 |
| Wetting agent | 1 |

In a preferred example, the resin is a mixture of 50% "Piccoflex 115" and 50% of "Picco 450 H" which are sold by the Pennsylvania Industrial Chemical Corporation. The carbon black is "Statix F–12" sold by Columbian Carbon Corporation. The solvent is industrial xylene sold under the brand name of "Hi Solv. X" by Pennsylvania Industrial Chemical Corporation: and the wetting agent is Soya Lecithin sold by Ross & Rowe under the trade name "Yelkin TTS."

The slurry is ball milled to form a dispersion of the carbon black in the dissolved resin. When a suitable dispersion has been accomplished, the slurry is dried in a spray drier. The resulting dry particles are directed by the air stream in the drier to one or more collectors of the cyclone type. The adjustment of these collectors serve to supply particles above the minimum desired size range directly and subsequent screening is resorted to eliminate oversize particles. The desired distribution of diameters of the particles is within 12 to 100 microns. The geometric mean of the particle diameters is in the range of 20 to 40 microns, and 98% by weight of the particles have diameters within the range of 12 to 80 microns. The resistivity of such an ink under a pressure of the order of 20 grams per square centimeter is of the order of 2,000 ohm-centimeters, i.e., in the range of from 200 to 20,000 ohm-centimeters. The upper limit of the volume resistivities of inks satisfactory for use in the process is substantially 20,000 ohm-centimeters. There is no lower limit.

When the portion of medium 10 having charged area 70 is in the layer of ink as illustrated in FIG. 7, a conductive path, or electric circuit, exists between the electric charges at the boundary between layers 30, 32, and the electric charges constituting charged area 70. The electric charges constituting charged area 70 induce opposite charges in the ink particles closest to area 70. Movement of electrons through ink powder 44 as a result of the induced charges establishes a current which neutralizes to some extent the positive charges at the boundary between dielectric 30 and backing layer 32. The induced charges in the ink particles closest to the charges forming area 70 establish a strong electric field which causes the ink particles in close proximity with area 70 to adhere to the charged area 70 of medium 10.

Figure 8:
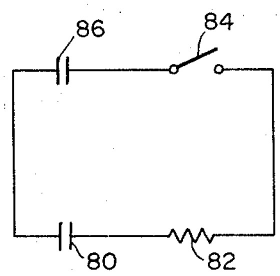
FIG. 8 is the electrical equivalent circuit of FIG. 7.

In FIG. 8, the equivalent electrical circuit of FIG. 7 is illustrated. Capacitor 80 is the equivalent of the capacitance per unit area of dielectric layer 30. Resistor 82 is equivalent of the resistance of a unit area of layer 32. When switch 84 is closed, or when medium 10 is immersed in the ink 44, some of the charge stored on capacitor 80 will flow through resistor 82 to charge capacitor 86, which is the equivalent of the capacitance per unit area of an equivalent capacitor defined as existing between the charges deposited on film 30 and the charges induced on the particles of ink powder nearest area 70. No resistor is illustrated to represent the equivalent resistance of the ink since the magnitude of the resistance of the powdered ink 44, in most applications, is negligible as compared with the resistance of the backing layer.

The capacitance per unit area of a ½ mil thick layer of polyethylene has been computed to be substantially 1100 microfarads per square inch. With a 3 mil thick layer of backing layer 32 having a volume resistivity of $5 \times 10^6$ ohm-centimeters, the time constant of the recording medium is approximately 6.1 microseconds. The amount of charge in equivalent capacitor 86 is a function of the time constant of the circuit. The period of time that the medium 10 should be in ink 44, or that the circuit through the ink should be maintained, is that necessary to cause a sufficient amount of ink to be attracted to and adhere to, charged area 70, so that a contrast between the inked and uninked areas is discernible. There is little need to maintain the circuit longer than four time constants of the circuit because, for any greater period of time, there is only a negligible increase in the amount of electric charge added to equivalent capacitor 86. A period substantially equal to four times the time constant of medium 10, in this example, is 24.4 microseconds. The time constant of the circuit of FIG. 8 is assumed to be approximately that of medium 10 since the capacitance of equivalent capacitor 86 is much greater than that of equivalent capacitor 80 because the distance between the ink particles nearest charged area 70 is much less than the thickness of dielectric layer 30. As a result, the capacitance of equivalent capacitors 80, 86, in series, can be assumed to be only slightly less than that of capacitor 80.

If recording medium 10 is being transported at a rate of 100 inches per second, then to keep medium 10 immersed in ink 44 for a period of four time constants of medium 10, it will be necessary to provide a thickness or depth of ink layer 44 in the inking station 40 of 2.44 mils. If the volume resistivity of the backing layer were of the order of $10^{11}$ ohm-centimeters and it is desired to move the ink at the recording medium at the same rate of speed; namely, 100 inches per second, it would be necessary that the thickness of the ink layer 44 be 48 inches. From the foregoing, the relationship between resistivity of the backing layer of the recording medium, the transport speed of the medium and the thickness of the ink layer at the inking station is seen. In order to keep the size of the inker within reasonable physical dimensions while still having high transport speed, it is necessary that the backing layer have relatively low volume resistivity.

Figure 9:
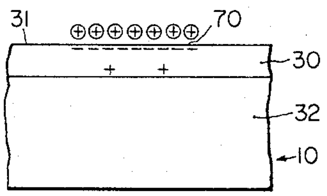
FIG. 9 is a schematic diagram illustrating the distribution of the charges and ink particles at the conclusion of the inking step when the backing layer is made of low resistivity material.

At the termination of the inking step, the idealized distribution of charges is substantially as that illustrated in FIG. 9 in which particles of ink have induced in them opposite charges to that deposited on the surface of dielectric layer 30 at the printing station. The magnitude of the electrostatic forces existing between the charges on dielectric layer 30 and the charges on the ink particles, are extremely high. It has been determined experimentally to be of the order of 8,000 times the force of gravity.

Figure 10:
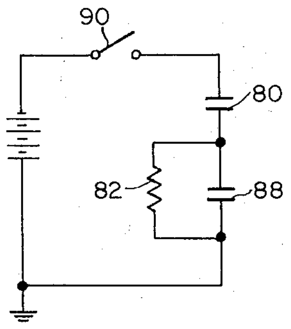
FIG. 10 is an electrical equivalent circuit of FIG. 4.

The question may arise as to why, if the time constant of the recording medium is very significant during the inking step, it is not equally as important in the establishing of a charged area. FIG. 10 is the electrical equivalent circuit of FIG. 4. Capacitor 80 represents again the capacitance per unit area across the dielectric layer 30; capacitor 88 represents the capacitance per unit area across the backing layer 32. Resistor 82 again represents the resistance of a unit area of the backing layer 32. The leading edge of the print voltage pulse which corresponds to closing switch 90 applies a high voltage across capacitors 80, 88. The capacitance of each of the capacitors 80, 88 is small so that the duration of a current pulse in medium 10 is very short, and the applied voltage is divided across capacitors 80, 88. The relatively low resistivity of backing layer 32 makes backing layer 32 the equivalent of an imperfect capacitor which discharges itself through its own resistance, leaving a corresponding fraction of electric charges across the dielectric layer 30. The time for capacitor 88 to discharge is again determined by the effective time constant of the discharge circuit and is a function of the magnitude of the resistivity of backing layer 32.

Figure 11:
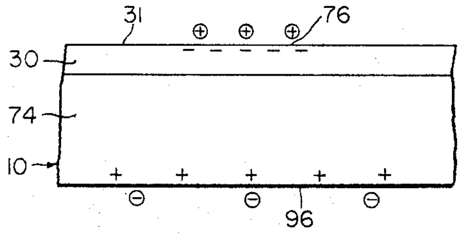
FIG. 11 is a schematic diagram illustrating the distribution of electric charges and ink, at the conclusion of the inking step of the recording process when the backing layer is made of a high resistivity material.

In FIG. 11, the idealized distributions of electric charges and ink particles after a recording medium, having a high resistivity backing layer 74, have passed through the inking station, are illustrated. Under such circumstances, a substantially equal and oppositely charged area 96 will exist on the exposed side of the backing layer. The size of area 96, however, will, in general, be greater than the size of charged area 76 deposited on dielectric layer 30. The surface density of the charges forming area 76 will also be less than the surface density of area 70. The charges on both sides of the recording medium will both induce charges in the ink particles closest to them while immersed in inker 40, establishing an external conductive path between layers 30, 74 and attracting particles of ink to the respective charges areas. Ink will adhere to both sides of the recording medium which, in most cases, is an undesired result. Thus a low resistivity backing layer has the further advantage of preventing ink from adhering to the backing layer of the recording medium.

From the foregoing, the importance of the conductivity of the backing layer in the printing and developing steps of the electrographic recording process is apparent. The explanation of the manner in which charges are established on the dielectric layer, the relationship between dielectric layer and resistivity of the backing layer in the formation of latent electrostatic images and in the inking of such images by powdered inks of low resistivity are the best explanations that have been developed to date. They are believed to be accurate and are supported by tests. They are, however, only the best theories for explaining results observed, known to the inventors at this time.

Obviously many modifications and variations of this invention are possible in the light of the above teachings. It may be understood that within the scope of the appended claims the invention may be practiced other than as specifically described and illustrated.

What is claimed is:

1. The process of developing information on a recording medium comprised of a dielectric layer of high resistivity attached to a backing layer of substantially lower resistivity than said dielectric layer, said information being comprised of electrically charged areas of said dielectric layer, said method comprising; establishing a relatively low resistance electrically conductive circuit of uncharged ink powder between the surface of the dielectric layer remote from said backing layer, and the backing layer to surround both layers, the backing layer of relatively low resistivity facilitating the completion of the electrical circuit between the opposite faces of the dielectric layer, and maintaining said circuit for a sufficient period of time so that a portion of said developing medium will adhere to each of said electrically charged areas of said film by depositing sufficient ink to develop the latent images.

2. The process of developing latent electrostatic images on a recording medium, said recording medium comprising a conductive backing layer having a resistivity of not more than $10^9$ ohm-centimeters and a dielectric layer bonded to said backing layer having a resistivity of not less than $10^{13}$ ohm-centimeters, each of said electrostatic images being comprised of at least an area of deposited electric charges on the surface of said dielectric layer remote from said backing layer and induced electric charges on the opposite side of said dielectric layer; said process comprising; surrounding said recording medium with an uncharged conductive developing powder in close proximity to both sides of said recording medium for a period of time sufficient to induce in the particles of said developing powder nearest each of said deposited electric charges, electric charges of a polarity opposite to that of the deposited charges, the electric fields, due to the deposited charges and the induced charges in the developing powder, strongly attracting at least some of the particles of the developing powder to each of the areas of deposited electric charges on the recording medium, said period of time being sufficient to attract sufficient powder to develop the latent images.

3. The process of developing latent electrostatic images on a recording medium, said recording medium comprising a conductive backing layer and a dielectric layer bonded to said backing layer, each of said electrostatic images being comprised of at least an area of first electric charges on the surface of said dielectric layer remote from said backing layer and induced electric charges on the opposite side of said dielectric layer, said first charges on the dielectric layer, the induced charges, and the dielectric layer between constituting a first equivalent charged capacitor, said process comprising; surrounding said recording medium with an uncharged conductive developing powder in close proximity to both sides of said recording medium to establish a second equivalent charged capacitor comprising a part of said first electric charges on the dielectric layer and electric charges induced in the particles of said developing powder nearest said deposited electric charge, the backing layer of relatively low resistivity facilitating the completion of the electrical circuit between the opposite faces of the dielectric layer, said surrounding being for a period of time sufficient to deposit sufficient developing powder to develop the latent images.

4. The process of developing latent electrostatic images on a recording medium comprised of a thin dielectric layer having two sides, one side of said dielectric layer being bonded to a conductive backing layer, each of said images being comprised of at least first electric charges substantially of one polarity on a selected area of the dielectric layer of the recording medium, and second electric charges of a polarity opposite said first charges induced on the other side of said dielectric layer, said developing process comprising; establishing an electric circuit interconnecting both sides of said dielectric layer, said circuit being comprised, at least in part, of a conductive powdered mass formed of a plurality of uncharged conductive powder particles surrounding said recording medium; said first electric charges inducing third electric charges of a polarity opposite that of said first charge on particles of the conductive powdered mass nearest said first electric charges on the dielectric layer; the electric fields between the first electric charges on the dielectric layer and the third electric charges induced on said particles of the powdered mass causing some particles of said powdered mass to adhere to each of said selected areas of said dielectric layer, sufficient particles being adhered to develop the latent images.

5. The process of developing information recorded on a recording medium, comprised of a backing layer of substantially uniform thickness having a thin dielectric film bonded to one side of said backing layer the resistivity of said backing layer being no greater than $10^9$ ohm-centimeters and the resistivity of the dielectric being no less than $10^{13}$ ohm-centimeters; said information comprising selected electrically charged areas of said dielectric film, said developing process comprising; immersing each portion of the recording medium in an uncharged ink powder developing medium having a resistivity of the order of 2,000 ohm-centimeters to surround both the film and the backing layer with uncharged ink powder for a minimum period of time, which minimum period of time is a function of the resistivity of said backing layer, which period is sufficient to deposit sufficient ink to develop the latent images.

6. The process of developing information on a recording medium, said medium, comprising: a backing layer of substantially uniform thickness having a thin dielectric film of substantially uniform thickness bonded to one side of said backing layer, the resistivity of said backing layer being in the range of from $10^5$ to $10^9$ ohm-centimeters, the resistivity of the dielectric being greater than $10^{13}$ ohm-centimeters; said information comprising electric charges on opposite sides of selected portions of said dielectric film, said process comprising establishing a conductive path between both sides of said medium by immersing each portion of the recording medium in an uncharged developing powder having a maximum resistivity of substantially 20,000 ohm-centimeters to surround both the backing layer and film for a minimum period of time substantially not less than four times the time constant of the recording medium to deposit sufficient powder to develop the information charges.

7. The process of recording information on a recording medium comprised of a backing layer and a thin film of a dielectric secured to one side of said backing layer; the resistivity of the backing layer being substantially less than the resistivity of said dielectric film comprising; establishing electrically charged areas on selected portions of the surface of said dielectric layer, establishing an electrical circuit interconnecting both sides of said medium by placing the recording medium in a powdered, low resistivity uncharged ink powder developing medium to surround both layers, the backing layer of relatively low resistivity facilitating the completion of the electrical circuit between the opposite faces of the dielectric layer and maintaining said circuit for a period of time sufficient to cause a portion of said developing medium to be electrically attracted to, and to adhere to the initially charged areas on the surface of the dielectric film and to deposit sufficient ink to develop the electrically charged areas.

8. The process of recording information on a recording medium comprised of a backing layer and a thin film of a dielectric secured to one side of said backing layer; the resistivity of the backing layer being substantially less than the resistivity of said dielectric film; comprising, electrically charging selected portions of said dielectric layer, subsequently surrounding both layers of the recording medium with a conductive developing medium of uncharged ink powder, keeping said recording medium surrounded by said medium for a period of time substantially not less than four times the time constant of the recording medium, whereby a portion of said developing medium nearest the charged portions of said dielectric layer are electrically attracted to and adhere to the surface of the dielectric film, said period of time being sufficient to deposit sufficient ink to develop the electrically charged portions, and fixing said developing medium to said recording medium.

9. A recording process comprising: producing by means of electrical discharges between at least two electrodes, electrically charged areas on selected portions of the exposed surface of a dielectric film which is bonded to a backing layer having relatively low resitsivity when compared with said film, said film and backing layer being between said electrodes when a charged area is formed on said film, developing said charged areas by immersing said film and backing layer in a mass of uncharged powdered electrically conductive ink powder to surround both the film and the backing layer, the backing layer of relatively low resistivity facilitating the completion of the electrical circuit between the opposite faces of the dielectric layer, said ink adhering substantially only to the charged areas of the dielectric film due to the electric forces existing between the charges on the film and charges induced in particles of ink by the charges on the film, said immersing being sufficient to deposit sufficient ink to develop said charged areas, and fixing the ink to the film.

10. A process for rendering visible a pattern of electric charges deposited upon a high-resistivity surface of a record medium and at least partially bound thereto by electric charges of opposite sign induced upon the opposite surface of the said record medium, comprising: bringing into contact with the said high-resistivity surface uncharged electrically conductive ink powder particles visibly differentiable therefrom by providing an electrically conductive path of low resistance uncharged ink powder to surround both surfaces of said record medium, said record medium having a relatively low resistance backing layer facilitating the completion of the electrical circuit between the opposite faces of said high-resistivity surface of said record medium whereby the said induced charges of opposite sign may flow into the said electrically conductive particles in closest proximity to the said pattern of electric charges to bind the said particles thereto by electric forces by depositing sufficient ink to develop the electric charges; and removing any said conductive particles not so bound.

11. The process of developing electrostatic latent images on a recording medium comprising subjecting a recording medium having a dielectric layer of high electrical resistivity and a backing layer of substantially lower electrical resistivity to an electric field to form one or more electrostatically charged areas on the dielectric layer, and completing an electric circuit of electrically conducting uncharged ink powder between the two layers of the recording medium thus charged by immersing the recording medium in said electrically conductive ink to surround both layers, the backing layer of relatively low resistance facilitating the completion of the electrical circuit between the opposite faces of the dielectric layer, said immersing being of sufficient duration to develop said latent images by depositing sufficient ink to develop the latent images.

12. An electrostatic recording process comprising electrostatically charging one or more areas of a surface of a dielectric layer of high electrical resistivity forming one side of a supporting layer of relatively low electrical resistivity, and rendering said one or more charged areas of the dielectric surface visible by forming an electrical circuit of low resistance between the opposite sides of the dielectric layer, the portion of the electrical circuit between the charged dielectric surface and the opposite backing layer surface being constituted by a mass of electrically conductive uncharged ink powder particles in electrical contact with one another to surround both layers, the supporting layer of relatively low resistivity facilitating the completion of the electrical circuit between the opposite faces of the dielectric surface, said circuit being maintained sufficiently long to deposit sufficient ink to develop said charged areas.

13. A recording process comprising: producing by means of electrical discharges between at least two electrodes, electrically charged areas on selected portions of the exposed surface of a dielectric film which is bonded to a backing layer having relatively low resistivity when compared with said film, said film and backing layer being between said electrodes when a charged area is formed on said film, and developing said charged areas by establishing a relatively low resistance electrical circuit of conductive uncharged ink powder between the exposed surface of the dielectric film and the backing layer to surround both the film and the backing layer, the backing layer of relatively low resistivity facilitating the completion of the electrical circuit between the opposite faces of the dielectric, said developing of said charged areas being sufficient by depositing sufficient ink to develop the charged areas.

14. The process of developing electrostatic latent images on a recording medium, which process comprises supporting a developer in the form of an uncharged ink powder comprising a mass of ink particles; and feeding a sheet-like recording member through the mass of ink particles such that the ink particles are in surrounding relation to both opposite sides of the recording member in contact with the opposite sides thereof, said recording member being characterized as composed of a supporting layer of electrically conductive material having a dielectric surface on one side thereof of high electrical resistivity bearing one or more discrete electrically charged areas thereon; and said developer being composed at least in part of electrically conductive uncharged ink powder particles in mutual touching relationship with one another and acting to complete an electric circuit from the dielectric surface side of the recording member to the opposite side thereof and to cause the ink particles in closest proximity to the dielectric surface to be attracted and bound thereto by electric forces, said circuit completion being of sufficient duration to deposit sufficient ink to develop the latent images, said supporting layer of electrically conductive material facilitating the completion of the electrical circuit between the opposite faces of said dielectric surface.

15. The process of developing electrostatic latent images on a recording medium comprised of a dielectric layer of high resistivity secured to a backing layer of substantially lower resistivity than said dielectric layer, comprising: providing the electrostatic latent images on the dielectric layer, establishing an electrically conductive circuit of low resistance uncharged ink powder between the dielectric layer and the backing layer to surround both layers, the backing layer of relatively low resistivity facilitating the completion of an electrical circuit between the opposite faces of the dielectric layer, the portion of said circuit in contact with the dielectric layer being formed of said uncharged ink powder and maintaining said circuit for a period of time, said period of time being sufficient to develop said latent images by depositing sufficient ink to develop the latent images.

16. A process for rendering visible a pattern of electric charges deposited upon a high-resistivity surface of a record medium and at least partially bound thereto by electric charges of opposite sign induced upon the opposite surface of the said record medium, said record medium having two portions, one of said portions being of high resistivity and having said high resistivity surface, the other of said portions being a low resistance backing member, having said opposite surface, comprising: providing a mass of uncharged electrically conductive ink powder particles visibly differentiable from said high-resistivity surface, and passing such a record member through said mass of particles so that the mass of particles complete an electrically conductive path between the said two surfaces of the record member and surround both surfaces whereby the said induced charges of opposite sign may flow into the said electrically conductive particles in closest proximity to the said pattern of electric charges to bind the said particles thereto by electric forces, said record medium backing member of relatively low resistance facilitating the completion of the electrical circuit between the opposite faces of said high-resistivity portion, said passing being of sufficient time to render said pattern visible by depositing sufficient ink to develop said pattern of charges.

17. In electrostatic recording, the process of forming a visible image on a recording member which comprises passing a sheet-like recording member bearing one or more discrete electrically charged areas on one side thereof through a mass of uncharged electrically conductive ink powder particles in electrically conductive relation to one another, said recording member comprising a high resistivity portion on the side which bears said charged areas and a low resistivity portion on the opposite side, the ink particles of the mass, surrounding both sides of the recording member and acting to complete an electric circuit from said charged side of the recording member to the other side thereof, the recording medium electrically charged area being supported by said low resistance recording medium portion facilitating completion of return of said eletcric circuit to the regions of said electrically charged areas, said passing of said sheet enabling depositing of sufficient ink on the charged areas to form the visible image.

18. In the process of electrostatic recording wherein a dielectric recording tape is passed between a pair of electrodes, a frontal recording electrode and a backing electrode, and is subjected to a voltage across the electrodes, said voltage being above the threshold voltage for current flow to said dielectric tape and also being directly related to a signal voltage whereby a charge is impressed in said dielectric tape corresponding to the signal, the improvement wherein the surface of the dielectric tape distant from said frontal recording electrode is electrically conductive.

19. A process as in claim 18 wherein said dielectric recording tape is in contact with said backing electrode.

20. A process as in claim 18 wherein one surface of said tape is in proximity to but out of contact with said recording electrode during the recording process.

21. An electrostatic recording medium comprising a backing layer of substantially electrically homogenous paper having a relatively low volume resistivity of the order of up to $10^9$ ohm-centimeters resistivity, a dielectric layer of material of relatively high volume resistivity regardless of illumination of the order of at least $10^{15}$ ohm-centimeters in intimate contact with said backing layer, said dielectric layer being of dielectric material which has a volume resistivity and dielectric constant such that its time constant is more than the maximum period between charging and inking steps of the electrostatic recording, said paper backing layer having a volume resistivity and dielectric constant such that the paper backing layer time constant of discharge is less than the minimum period of 5 to 30 milliseconds of travel, and discharge of the paper layer capacitor formed due to its capacitance occurs between charging and inking steps of the electrostatic recording where traveling of the medium through charging and inking stations is of the order of at least 100 inches per second.

22. A recording medium for use in an electrostatic printing process in which a latent image in the form of a charged area pattern is established on said medium and to which ink particles selectively adhere to the charged area during a following developing step, said medium comprising a first and a second layer of material secured together, said first layer being that on which the charged area pattern is established and comprising a high dielectric organic polymer resin material selected from the group consisting of polyethylene and polystyrene and further comprising approximately 15 percent by weight of titanium dioxide, said first layer being of volume resistivity of at least $10^{15}$ ohm-centimeters which resistivity is unaffected by illumination, said second layer being of paper having a range of conductivity whose upper limit of volume resistivity is $10^9$ ohm-centimeters, said dielectric layer being approximately in the range from 0.0005 inch to 0.001 inch thick and said paper backing layer being approximately 0.003 inch thick.

23. An electrostatic recording medium comprising a thin first layer formed of charge-retentive dielectric material for receiving an electrostatic charge pattern, said dielectric material being of high dielectric constant and of high volume resistivity regardless of illumination of at least $10^{13}$ ohm-centimeters and a conductive backing layer of a paper material having a lower volume resistivity within the range of $10^5$ ohm-centimeters to $10^9$ ohm-centimeters.

24. The electrostatic recording medium of claim 23 wherein the first dielectric layer comprises a high dielectric organic polymer resin material seletced from the group consisting of polyethylene and polystyrene and the first layer material further comprises approximately 15 percent by weight of titanium dioxide, and wherein the first layer has a volume resistivity of at least the order of $10^{15}$ ohm-centimeters.

References Cited

UNITED STATES PATENTS

| | | | |
|---|---|---|---|
| 2,281,602 | 5/1942 | Ruben | 117—201 |
| 2,471,607 | 5/1949 | Calkin | 117—155 X |
| 2,714,571 | 8/1955 | Irion et al. | 117—155 X |
| 2,833,648 | 5/1958 | Walkup | 117—17.5 X |
| 2,855,324 | 10/1958 | Van Dorn | 117—17.5 X |
| 2,914,403 | 11/1959 | Sugarman | 117—17.5 X |
| 2,937,943 | 5/1960 | Walkup | 117—17.5 X |
| 3,037,478 | 6/1962 | Lace | 117—17.5 X |
| 3,052,539 | 9/1962 | Greig | 117—17.5 X |
| 3,084,061 | 4/1963 | Hall | 117—17.5 X |
| 2,221,776 | 11/1940 | Carlson | 117—17.5 X |
| 2,297,691 | 10/1942 | Carlson | 117—17.5 X |
| 2,647,464 | 8/1953 | Ebert | 117—17.5 X |
| 2,832,511 | 4/1958 | Stockdale et al. | 117—15.5 X |
| 2,851,373 | 9/1958 | Tregay et al | 117—17.5 X |
| 2,862,815 | 12/1958 | Sugarman et al. | 117—17.5 X |
| 2,890,968 | 6/1959 | Giaimo | 117—17.5 X |
| 2,919,672 | 1/1960 | Benn et al. | 117—17.5 X |
| 2,384,541 | 9/1945 | Fruth | 117—132 |
| 2,996,400 | 8/1961 | Rudd et al. | 118—637 |

WILLIAM D. MARTIN, *Primary Examiner.*

E. J. CABIC, *Assistant Examiner.*

U.S. Cl. X.R.

117—201; 118—637; 252—62.1; 340—173; 346—1, 77